(12) United States Patent
Huang et al.

(10) Patent No.: US 12,305,895 B2
(45) Date of Patent: May 20, 2025

(54) HEAT PUMP SYSTEM AND METHOD FOR IMPLEMENTING EFFICIENT EVAPORATION BY USING GEOTHERMAL WELL

(71) Applicant: GUANGZHOU INSTITUTE OF ENERGY CONVERSION, CHINESE ACADEMY OF SCIENCES, Guangzhou (CN)

(72) Inventors: Wenbo Huang, Guangzhou (CN); Fangming Jiang, Guangzhou (CN); Juanwen Chen, Guangzhou (CN); Jiwen Cen, Guangzhou (CN); Wenjiong Cao, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 238 days.

(21) Appl. No.: 18/012,991

(22) PCT Filed: Sep. 7, 2021

(86) PCT No.: PCT/CN2021/116886
§ 371 (c)(1),
(2) Date: Dec. 27, 2022

(87) PCT Pub. No.: WO2022/022750
PCT Pub. Date: Feb. 3, 2022

(65) Prior Publication Data
US 2023/0243556 A1    Aug. 3, 2023

(30) Foreign Application Priority Data
Sep. 15, 2020 (CN) .......................... 202010968643.0

(51) Int. Cl.
*F25B 30/06* (2006.01)
*F24T 10/10* (2018.01)
*F24T 10/30* (2018.01)

(52) U.S. Cl.
CPC .............. *F25B 30/06* (2013.01); *F24T 10/10* (2018.05); *F24T 10/30* (2018.05)

(58) Field of Classification Search
CPC ... F24T 10/40; F24T 2010/56; F28D 15/0266; F28D 15/04; F28D 2015/0216;
(Continued)

(56) References Cited

FOREIGN PATENT DOCUMENTS

| CN | 205090847 U | 3/2016 |
|---|---|---|
| CN | 107144035 A | 9/2017 |

(Continued)

*Primary Examiner* — Elizabeth J Martin
(74) *Attorney, Agent, or Firm* — Bayramoglu Law Offices LLC

(57) ABSTRACT

A heat pump system and a method for implementing efficient evaporation by using a geothermal well are provided. The system includes a stepped underground evaporator, a compressor, a condenser, a liquid storage tank, and a throttle. The underground evaporator includes an inner pipe and an outer pipe. The inner pipe is designed into a multi-section structure. Each section includes a gas guiding pipeline, a baffle plate, and a seepage hole. Under the action of the structure, a liquid working medium flowing into the underground evaporator flows downwards along an inner wall of the outer pipe, and absorbs heat from an underground rock mass and gasifies into a gas working medium; and the gas working medium flows upwards to ground. Compared with the prior art, neither gas-liquid re-entrainment nor a liquid accumulation effect can occur in the underground evaporator designed according to the system and method.

13 Claims, 2 Drawing Sheets

(58) Field of Classification Search
CPC ........ F28D 15/02; F28D 15/00; F28D 15/043; F28D 15/046; F28D 15/06; F28D 15/0275; F28D 15/0283
See application file for complete search history.

(56) References Cited

FOREIGN PATENT DOCUMENTS

| | | | | |
|---|---|---|---|---|
| CN | 206683273 U | 11/2017 | | |
| CN | 107576159 A | 1/2018 | | |
| CN | 108344317 A | 7/2018 | | |
| CN | 208205842 U | 12/2018 | | |
| CN | 109798794 A | 5/2019 | | |
| CN | 110030746 A | * 7/2019 | .............. | F24T 10/17 |
| CN | 210291850 U | 4/2020 | | |
| JP | 2003301434 A | 10/2003 | | |

* cited by examiner

HEAT PUMP SYSTEM AND METHOD FOR IMPLEMENTING EFFICIENT EVAPORATION BY USING GEOTHERMAL WELL

CROSS REFERENCE TO THE RELATED APPLICATIONS

This application is the national phase entry of International Application No. PCT/CN2021/116886, filed on Sep. 7, 2021, which is based upon and claims priority to Chinese Patent Application No. 202010968643.0, filed on Sep. 15, 2020, the entire contents of which are incorporated herein by reference.

TECHNICAL FIELD

The present invention relates to the field of geothermal energy development, and specifically, to a heat pump system and a method for implementing efficient evaporation by using a geothermal well.

BACKGROUND

With the reduction of fossil fuel reserves and increasingly serious environmental problems caused by development and utilization of fossil fuel, people pay much attention to renewable and non-polluting new energy sources. Compared with other renewable energy sources, geothermal energy, being stable, reliable, and independent of factors such as weather, season, climate, and diurnal variation, is more suitable to be used as a basic energy source of heating and electric power system. At present, development and utilization of geothermal resources include not only direct utilization of heating and planting, but also achieve geothermal refrigeration and medium and high temperature geothermal resources for power generation.

There is a great demand for heating in northern China. At the present stage, the traditional central heating mode that mainly depends on fuel coal is mainly used in northern China. With the increase of heating demand and increasingly strict restrictions on fuel coal heating, such heating mode has become increasingly unsatisfactory to current heating demand.

A heat pump is an apparatus forcing heat to flow from a low-grade heat source to a high-grade heat source. In other words, the heat pump can convert low-grade heat energy that cannot be directly used, such as air, soil, water, solar energy, and industrial waste heat into usable high-grade energy, so as to achieve the purpose of energy saving and emission reduction. At present, heat pumps have been widely used in heating ventilation air conditioning engineering, which is a potential energy saving technology.

However, a ground-source heat pump system uses electric energy to utilize a low-grade geothermal resource for heating, thereby being a novel efficient and environment-friendly air-conditioning system. Generally, the system requires laying buried pipes underground and circulating water through the pipes and absorbs a low-grade geothermal resource in a shallow layer to heat a cold end of the heat pump system. Because geothermal temperature in the shallow layer in winter is significantly higher than outdoor air temperature, heating efficiency of the ground-source heat pump system can be significantly higher than heating efficiency of a conventional heat pump system, thereby reducing power consumption.

However, soil temperature decreases gradually due to long-term running of a ground-source heat pump, leading to problems such as efficiency reduction and an insufficient heating capability of a heat pump unit. To reduce a decrease rate of soil temperature, it is necessary to lay heat exchange pipelines in a large area, which increases initial investment costs, reduces economy of the system, and restricts extensive promotion of the technology to a certain extent.

SUMMARY

To overcome defects in the prior art, the present invention provides a heat pump system and a method for implementing efficient evaporation by using a geothermal well, thereby greatly improving heating efficiency of the heat pump system without increasing a heat exchanger area of pipelines.

To achieve the above objective, the present invention adopts the following technical solution.

A heat pump system for implementing efficient evaporation by using a geothermal well, including an underground evaporator, a liquid storage tank, a condenser and a compressor that are connected in turn through a pipeline, wherein the liquid storage tank is provided with an exhaust/liquid injection valve; the underground evaporator is at least partially disposed under the ground and is provided with an inner pipe and an outer pipe; the inner pipe includes a plurality of separated sections that are arranged axially; each of the separated sections includes a gas guiding pipeline and a baffle plate; the gas guiding pipeline is disposed near an axial center of the outer pipe; an axial center of the gas guiding pipeline is coincident with or parallel to the axial center of the outer pipe; a higher end and a lower end of the baffle plate are respectively connected to an outer wall surface of the gas guiding pipeline and an inner wall surface of the outer pipe, such that a reservoir provided with a slant inner reservoir surface is formed; a plurality of seepage holes are formed in the reservoir; a certain gap exists between one gas guiding pipeline and a gas guiding pipeline of an adjacent separated section to form a gas channel; an upstream pipeline of the compressor is connected to the gas guiding pipeline; and a downstream pipeline of the liquid storage tank is connected to the reservoir.

Further, the heat pump system for implementing efficient evaporation by using a geothermal well as mentioned above, the liquid storage tank is provided with an exhaust/liquid injection valve; and the exhaust valve/liquid injection valve is configured to exhaust non-condensable gas in the liquid storage tank and inject a fluid working medium into the liquid storage tank.

Further, the heat pump system for implementing efficient evaporation by using a geothermal well as mentioned above, a liquid-level sensor, configured to detect a depth of a liquid accumulated in the underground evaporator, is disposed in a bottom of the underground evaporator.

Further, the heat pump system for implementing efficient evaporation by using a geothermal well as mentioned above, a downstream pipeline of the condenser is provided with a throttle; and the throttle is configured to adjust a reflux amount of a liquid working medium.

Further, the heat pump system for implementing efficient evaporation by using a geothermal well as mentioned above, the evaporator is disposed in an underground target rock mass; and the target rock mass includes soil, hypertonic aqueous rock mass, hot dry rock, and artificial fractured rock mass built by means of hydraulic power excitation.

Further, the heat pump system for implementing efficient evaporation by using a geothermal well as mentioned above, a fluid working medium circulating in the heat pump system includes distilled water, ammonia, carbon dioxide, and organic working substance medium.

Further, the heat pump system for implementing efficient evaporation by using a geothermal well as mentioned above, a length of a gas guiding pipeline of a separated section near a top location is greater than a length of a separated section at any location.

An efficient evaporation method using a geothermal well is used for the heat pump system. The method includes the following:

a fluid working medium flows from a liquid storage tank into a separated section at a topmost part of an underground evaporator and flows downwards along an inner wall of an outer pipe under the action of an in-pipe structure; a liquid working medium in each separated section absorbs heat from a target rock mass through the outer pipe and gasifies into a gas working medium; and the gas working medium enters a gas guiding pipeline through a gas channel, flows into a compressor for pressurization and heating up, then flows into a condenser for heat releasing and condensation, and finally flows back into the liquid storage tank.

Further, before the fluid working medium flows from the liquid storage tank into the underground evaporator, the evaporation method further includes:

determining an appropriate well setting location via geological survey, and drilling a well from a ground to a target rock mass;

designing a heat collecting rate based on downhole measured temperature data and the system, estimating a flow rate of the working medium, and determining a quantity and a size of seepage holes and a height of each section via calculation and experiments, thereby ensuring that the fluid working medium can flow along the inner wall of the outer pipe;

processing the seepage holes in a baffle plate based on a selected parameter, welding a top of the baffle plate with the gas guiding pipeline, and then welding a bottom of the baffle plate onto the inner wall of the outer pipe;

fixing a liquid-level sensor on a bottom blind plate of the outer pipe;

performing a downhole casing operation, disposing the processed outer pipe into a drilled well, and pouring slurry into a gap between the outer pipe and a wellhole of the drilled well to fix the well and fill a gap between the outer pipe and the rock mass;

vacuumizing the system through an exhaust/liquid injection valve, closing a throttle, and injecting a sufficient amount of the fluid working medium into the liquid storage tank; and gradually opening the throttle to make the system start to run, and appropriately increasing an opening degree of the throttle when a liquid-level sensor reaches a target liquid level, on the contrary, appropriately decreasing the opening degree of the throttle.

Compared with the prior art, the present invention has the following beneficial effects:

The present invention replaces buried pipes of a traditional ground-source heat pump with a vertical geothermal well to absorb geothermal energy, thereby greatly reducing floor space. Moreover, a geothermal resource having higher temperature can be utilized, thereby improving efficiency of the heat pump.

In the present invention, an evaporator of a heat pump is disposed in the geothermal well, and can directly exchange heat with an underground rock mass without using circulating water as a heat transfer carrier or disposing a water circulation system and a ground evaporator. This not only reduces electrical energy consumed in maintaining water circulation, but also greatly simplifies a ground equipment of a heat pump system. Moreover, due to simplification of a heat transfer method, the system can achieve a higher rate of heat transfer under the same geothermal condition and evaporation temperature, thereby improving overall running efficiency of the heat pump system.

An internal structure of an underground evaporator designed in the present invention can implement flow separation of a gas working medium and a liquid working medium, thereby avoiding occurrence of gas-liquid re-entrainment. In addition, the structure can also make the liquid working medium keep flowing along an inner wall of an outer pipe, thereby greatly improving heat exchange efficiency of the underground evaporator.

According to the design of the present invention, a reflux amount control valve for a working medium is included; and a liquid-level detection apparatus is disposed at the bottom of a heat pipe. In practical application, the reflux amount of the working medium can be adjusted according to a value of the liquid-level detection apparatus. The design is more practical and can avoid liquid accumulation and dry burning in the underground evaporator.

BRIEF DESCRIPTION OF THE DRAWINGS

To describe the technical solutions in embodiments of the present invention more clearly, the accompanying drawings required in the embodiments will be briefly described below. Apparently, the accompanying drawings in the following description show merely some embodiments of the present application, and a person of ordinary skill in the art may still derive other drawings from these accompanying drawings without creative efforts.

FIGS. 2A and 2B show a schematic diagram of connecting a gas guiding pipeline, a baffle plate, and a seepage hole according to an embodiment of the present invention, wherein FIG. 2A is a side view of an inner pipe, and FIG. 2B is a vertical view of the inner pipe.

Figure 1:
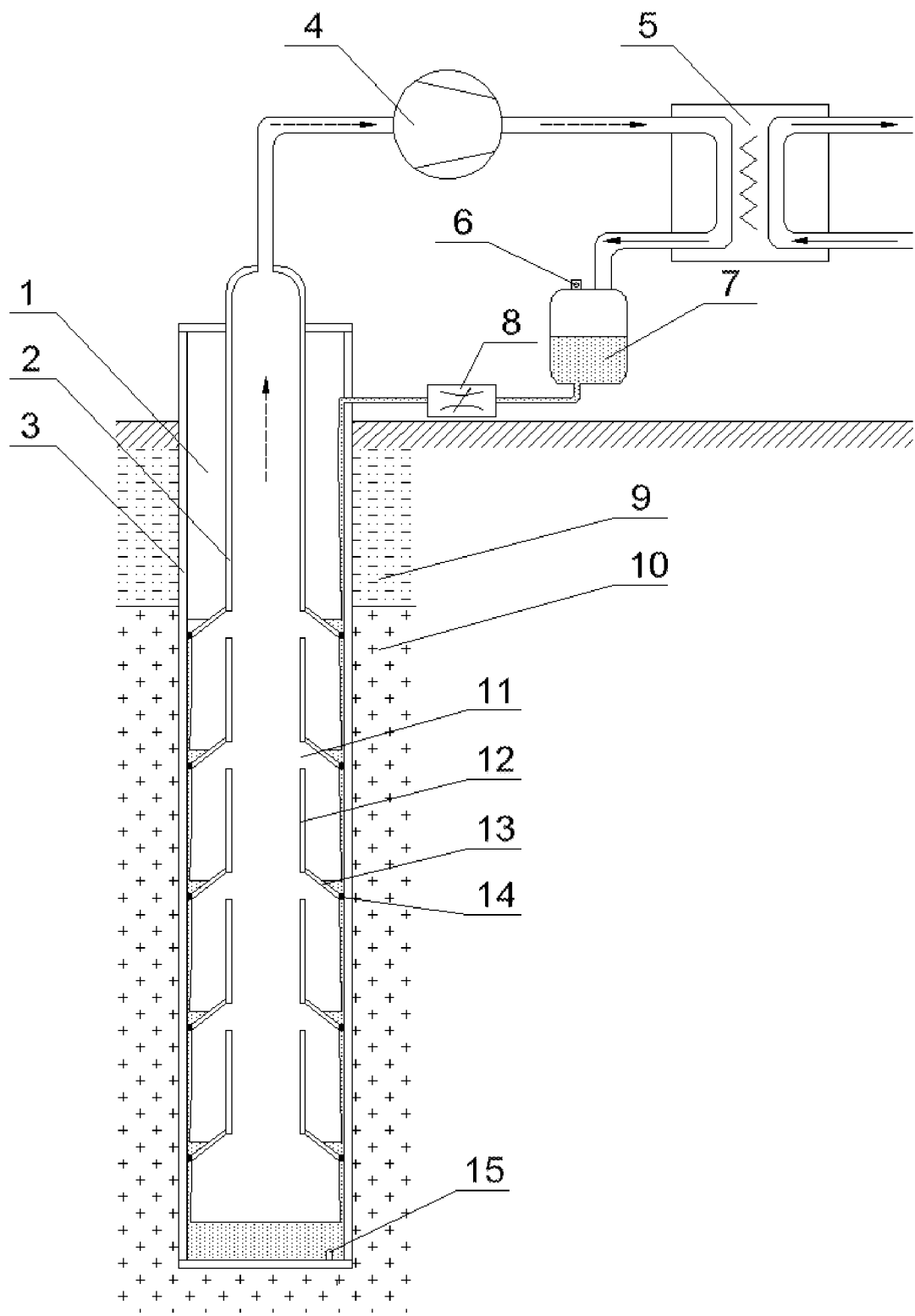
FIG. 1 is a schematic structural diagram of a heat pump system for implementing efficient evaporation by using a geothermal well according to an embodiment of the present invention.

Reference numerals in the accompanying drawings are as follows: 1: underground evaporator; 2: inner pipe; 3: outer pipe; 4: compressor; 5: condenser; 6: exhaust/liquid injection valve; 7: liquid storage tank; 8: throttle; 9: shallow rock mass/soil; 10: target rock mass; 11: gas channel; 12: gas guiding pipeline; 13: baffle plate; 14: seepage hole; and 15: liquid-level sensor.

DETAILED DESCRIPTION OF THE EMBODIMENTS

The content of the present invention will be further described in detail below with reference to the accompanying drawings and specific embodiments.

Embodiments:

The technical solutions of the embodiments of the present invention are clearly and completely described below with reference to the accompanying drawings in the embodiments of the present invention. Apparently, the described embodiments are merely some rather than all of the embodiments of the present invention. All other embodiments obtained by a person of ordinary skill in the art based on the embodiments of the present application without creative efforts shall fall within the protection scope of the present application.

It should be understood that the orientation or position relationships indicated by terms "central", "longitudinal", "transverse", "length", "width", "thickness", "upper", "lower", "front", "back", "left", "right", "vertical", "horizontal", "top", "bottom", "inner", "outer", "clockwise", "anticlockwise", "axial", "radial", "circumferential", and the like are orientation or position relationships shown in the accompanying drawings, and are merely intended to facilitate the description of the present invention and simplify the description, rather than to indicate or imply that the mentioned apparatus or elements must have a specific orientation or be constructed and operated in a specific orientation. Therefore, these terms may not be construed as a limitation to the present invention.

In the present invention, unless expressly specified and defined otherwise, a first feature being "above" or "below" a second feature may include direct contact between the first and second features or in indirect contact between the first and second features through an inter-medium. Moreover, the first feature being "on", "above", or "over" the second feature may be the first feature being directly above or obliquely above the second feature, or simply means that the level of the first feature is higher than the level of the second feature. The first feature being "beneath", "below", or "under" the second feature may be the first feature being directly below or obliquely below the second feature, or simply means that the level of the first feature is lower than the level of the second feature.

Figure 2A:
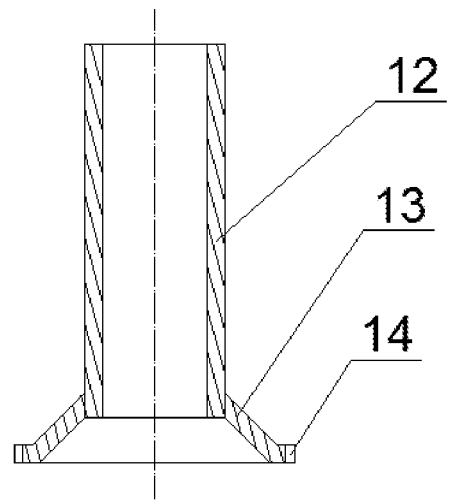
Figure 2B:
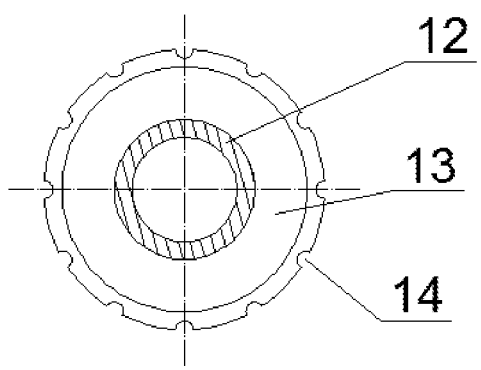

Referring to FIG. 1 and FIGS. 2A and 2B, FIG. 1 is a schematic structural diagram of a heat pump system for implementing efficient evaporation by using a geothermal well according to an embodiment of the present invention; and FIGS. 2A and 2B show a schematic diagram of connecting a gas guiding pipeline 12, a baffle plate 13, and a seepage hole 14 according to an embodiment of the present invention, wherein for convenience of identification, closed solid lines for upper ends and lower ends of the inner pipe and the baffle plate are omitted in FIG. 1; actual cross-sectional views of the inner pipe and the baffle plate should be consistent with FIG. 2A.

A heat pump system for implementing efficient evaporation by using a geothermal well includes an underground evaporator 1, a liquid storage tank, a condenser 5, and a compressor 4 that are connected in turn through a pipeline. The underground evaporator 1 is at least partially disposed under the ground. In this embodiment, an appearance of the underground evaporator 1 is matched with an appearance of an underground well, and takes the shape of a long cylinder. All of the liquid storage tank, the condenser 5, and the compressor 4 are disposed above the ground. The underground evaporator 1 is provided with an inner pipe 2 and an outer pipe 3. The inner pipe 2 includes a plurality of separated sections that are arranged axially. Each of the separated sections includes a gas guiding pipeline 12, a baffle plate 13 and a seepage hole 14. The gas guiding pipeline 12 is disposed near an axial center of the outer pipe 3. An axial center of the gas guiding pipeline 12 is coincident with or parallel to the axial center of the outer pipe 3. The baffle plate 13 takes the shape of an inclined surface of a truncated cone. A higher end and a lower end of the baffle plate 13 are respectively connected to an outer wall surface of the gas guiding pipeline 12 and an inner wall surface of the outer pipe 3, such that a reservoir provided with a slant inner reservoir surface is formed. A plurality of seepage holes 14 are formed in the reservoir. Preferably, the seepage holes 14 are formed in an edge at a bottom of the baffle plate 13. A certain gap exists between one gas guiding pipeline 12 and a gas guiding pipeline 12 of an adjacent separated section to form a gas channel 11. After the liquid working medium absorbs heat in the section and gasifies into a gas working substance, the gas working medium enters the gas guiding pipeline 12 through the gas channel 11, and then flows upwards to the compressor 4 disposed on the ground. After being depressurized through a throttle 8, a liquid working medium in a liquid storage tank is injected into a gap between the outer pipe 3 and the inner pipe 2 of the underground evaporator 1, and keeps flow downwards along a wall surface of the outer pipe 3. The liquid working substance absorbs heat in the flowing process from an underground environment through a pipe wall of the outer pipe 3, and gasifies into a gas working substance. The gas working medium enters the inner pipe 2, and flows into the compressor 4. After being pressurized and heated up by the compressor 4, the gas working medium enters the condenser 5 to release heat for heating. Then, the working medium is condensed into a liquid working medium that flows into the reservoir tank. In addition, the liquid working medium is injected from a top of the underground evaporator 1 into a gap between the gas guiding pipeline 12 and the outer pipe 3, flows downwards, gathers on an inner wall of the outer pipe 3 under the action of the baffle plate 13, and then flows along the inner wall of the outer pipe 3 to a next section through the seepage holes 14 in the edge at the bottom of the baffle plate 13, thereby keeping the inner wall of the outer pipe 3 wet.

On the ground, a steam outlet in the top of the underground evaporator 1 is connected to the compressor 4. The condenser 5 exchange heat with a heating system. A condensate outlet of the condenser 5 is connected to the liquid storage tank. After being depressurized through the throttle 8, the liquid working medium in the liquid storage tank is injected into a circular gap between the inner pipe 2 and the outer pipe 3 at the top of the underground evaporator 1, namely, into a plurality of reservoirs arranged in an axis direction, and evaporates into gas again for circulation. Specifically, the liquid working medium flows downwards in the reservoir defined by the inner pipe 2 and the outer pipe 3, flows under the action of a slant inner reservoir surface to a region where a bottom of the baffle plate 13 is in contact with the outer pipe 3 and where a plurality of seepage holes 14 are formed, and then flows in the seepage holes 14 downwards to a next section along a wall surface of the outer pipe 3.

As an optional implementation, in some embodiments, a liquid-level sensor 15, configured to detect a depth of a liquid accumulated in the underground evaporator 1, is disposed in a bottom of the underground evaporator 1.

As an optional implementation, in some embodiments, a downstream pipeline of the condenser 5 is provided with the throttle 8. The throttle 8 is configured to adjust a reflux amount of a liquid working medium. When the system runs, a liquid level at the bottom of the underground evaporator 1 can be kept within a certain range by adjusting an opening degree of the throttle 8. According to the method, dry burning and liquid accumulation in the underground evaporator 1 can be avoided in a running process.

As an optional implementation, in some embodiments, the evaporator is disposed in an underground target rock mass 10. The target rock mass 10 includes soil, hypertonic aqueous rock mass, hot dry rock, and artificial fractured rock mass built by means of hydraulic power excitation.

As an optional implementation, in some embodiments, a fluid working substance circulating in the heat pump system includes soil, hypertonic aqueous rock mass, hot dry rock, and artificial fractured rock mass built by means of hydraulic power excitation.

As an optional implementation, in some embodiments, for a topmost separated section, a height of the gas guiding pipeline may be appropriately increased, thereby preventing the fluid working substance from being in contact with a shallow rock mass/soil 9 with lower temperature.

The implementation method of this embodiment includes:
1) determining an appropriate well setting location via geological survey, and drilling a well from a ground to a target rock mass 10;
2) designing a heat collecting rate based on downhole measured temperature data and the system, estimating a flow rate of the working medium, and determining a quantity and sizes of the seepage holes 14 and a height of each section via calculation and an experiment, thereby ensuring that the fluid working medium can flow along an inner wall of an outer pipe;
3) forming the seepage holes 14 in a baffle plate 13 based on a parameter selected in step 2, welding a top of the baffle plate 13 with a gas guiding pipeline 12, and then welding a bottom of the baffle plate 13 onto the inner wall of the outer pipe 3;
4) fixing a liquid-level sensor 15 on a bottom blind plate of the outer pipe 3;
5) performing a downhole casing operation, disposing the outer pipe 3 into a drilled well after the operation, and pouring slurry into a gap between the outer pipe 3 and a wellhole of the drilled well to fix the well and fill a gap between the outer pipe 3 and the rock mass;
6) vacuumizing the system through an exhaust/liquid injection valve 6, closing a throttle 8, and injecting a sufficient amount of the fluid working medium into a liquid storage tank 7; and
7) gradually opening the throttle 8 to make the system start to run, and appropriately increasing an opening degree of the throttle 8 when a liquid-level sensor 15 reaches a target liquid level, on the contrary, appropriately decreasing the opening degree of the throttle 8.
8) in a running process, the fluid working medium flows through the throttle 8 from the liquid storage tank 7 into a separated section at a topmost part of an underground evaporator 1 and flows downwards along the inner wall of the outer pipe 3 under the action of an in-pipe structure; a liquid working medium in each separated section absorbs heat from a target rock mass 10 through the outer pipe 3 and gasifies into a gas working medium; and the gas working medium enters a gas guiding pipeline 12 through a gas channel 11, flows into a compressor 4 for pressurization and heating up, then flows into a condenser 5 for heat releasing and condensation, and finally flows back into the liquid storage tank 7.

In this specification, descriptions of reference terms such as "one embodiment", "some embodiments", "an example", "a specific example" and "some examples" indicate that specific features, structures, materials or characteristics described in combination with the embodiment(s) or example(s) are included in at least one embodiment or example of the present invention. In this specification, schematic representation of the above terms is not necessarily directed to the same embodiment or example. Furthermore, the specific features, structures, materials, or characteristics described may be combined in an appropriate manner in any one or more embodiments or examples. Moreover, on the premise of no contradiction, those skilled in the art may integrate or combine different embodiments or examples as well as features of the different embodiments or examples described in the description.

The above embodiments are merely used to illustrate the technical concept and characteristics of the present invention, are intended to make those of ordinary skill in the art understand the content of the present invention and implement the present invention based on the content, and should not limit the protection scope of the present invention. Any equivalent change or modification figured out based on the essence of the content of the present invention shall fall within the protection scope of the present invention.

What is claimed is:

1. A heat pump system for implementing an evaporation by using a geothermal well, comprising an underground evaporator, a liquid storage tank, a condenser and a compressor, wherein the underground evaporator, the liquid storage tank, the condenser and the compressor are connected in turn through a pipeline, wherein the underground evaporator is at least partially disposed under the ground and is provided with an inner pipe and an outer pipe; the inner pipe comprises a plurality of separated sections, wherein the plurality of separated sections are arranged axially; each of the plurality of separated sections comprises a gas guiding pipeline and a baffle plate; the gas guiding pipeline is disposed adjacent to an axial center of the outer pipe; an axial center of the gas guiding pipeline is coincident with or parallel to the axial center of the outer pipe;

a higher end and a lower end of the baffle plate are respectively connected to an outer wall surface of the gas guiding pipeline and an inner wall surface of the outer pipe, wherein a reservoir is formed, wherein the reservoir is provided with a slant inner reservoir surface; a plurality of seepage holes are formed in the reservoir; a predetermined gap exists between one gas guiding pipeline and a gas guiding pipeline of an adjacent separated section to form a gas channel; an upstream pipeline of the compressor is connected to the gas guiding pipeline; and a downstream pipeline of the liquid storage tank is connected to the reservoir.

2. The heat pump system according to claim 1, wherein the liquid storage tank is provided with an exhaust/liquid injection valve; and the exhaust/liquid injection valve is configured to exhaust a non-condensable gas in the liquid storage tank and inject a fluid working medium into the liquid storage tank.

3. The heat pump system according to claim 1, wherein a liquid-level sensor is disposed in a bottom of the underground evaporator, wherein the liquid-level sensor is configured to detect a depth of a liquid accumulated in the underground evaporator.

4. The heat pump system according to claim 1, wherein a downstream pipeline of the condenser is provided with a throttle; and the throttle is configured to adjust a reflux amount of a liquid working medium.

5. The heat pump system according to claim 1, wherein the underground evaporator is disposed in an underground target rock mass; and the underground target rock mass comprises a soil, a hypertonic aqueous rock mass, a hot dry rock, and an artificial fractured rock mass, wherein the artificial fractured rock mass is built by means of a hydraulic power excitation.

6. The heat pump system according to claim 1, wherein a fluid working medium comprises distilled water, ammonia, carbon dioxide, and an organic working medium, wherein the fluid working medium circulates in the heat pump system.

7. The heat pump system according to claim 1, wherein a length of a gas guiding pipeline of a separated section adjacent to a top location is greater than a length of a separated section at any location.

8. An evaporation method using a geothermal well, applied to the heat pump system according to claim 1, wherein the evaporation method comprises the following:
- a fluid working medium flows from the liquid storage tank into a separated section at a topmost part of the underground evaporator and flows downwards along an inner wall of the outer pipe under an action of an in-pipe structure;
- a liquid working medium in each of the plurality of separated sections absorbs heat from an underground target rock mass through the outer pipe and gasifies into a gas working medium; and
- the gas working medium enters the gas guiding pipeline through the gas channel, flows into the compressor for pressurization and heating up, flows into the condenser for heat releasing and condensation, and flows back into the liquid storage tank.

9. The evaporation method according to claim 8, wherein in the heat pump system, the liquid storage tank is provided with an exhaust/liquid injection valve; and the exhaust/liquid injection valve is configured to exhaust a non-condensable gas in the liquid storage tank and inject the fluid working medium into the liquid storage tank.

10. The evaporation method according to claim 8, wherein in the heat pump system, a liquid-level sensor is disposed in a bottom of the underground evaporator, wherein the liquid-level sensor is configured to detect a depth of a liquid accumulated in the underground evaporator.

11. The evaporation method according to claim 8, wherein in the heat pump system, a downstream pipeline of the condenser is provided with a throttle; and the throttle is configured to adjust a reflux amount of the liquid working medium.

12. The evaporation method according to claim 8, wherein in the heat pump system, the underground evaporator is disposed in the underground target rock mass; and the underground target rock mass comprises a soil, a hypertonic aqueous rock mass, a hot dry rock, and an artificial fractured rock mass, wherein the artificial fractured rock mass is built by means of a hydraulic power excitation.

13. The evaporation method according to claim 8, wherein in the heat pump system, the fluid working medium comprises distilled water, ammonia, carbon dioxide, and an organic working medium, wherein the fluid working medium circulates in the heat pump system.

* * * * *